(12) United States Patent
Kuang et al.

(10) Patent No.: US 12,143,974 B2
(45) Date of Patent: Nov. 12, 2024

(54) TRANSCEIVER DEVICE AND SCHEDULING DEVICE

(71) Applicant: Panasonic Intellectual Property Corporation of America, Torrance, CA (US)

(72) Inventors: Quan Kuang, Langen (DE); Hidetoshi Suzuki, Kanagawa (JP); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 502 days.

(21) Appl. No.: 17/398,858

(22) Filed: Aug. 10, 2021

(65) Prior Publication Data

US 2021/0368507 A1  Nov. 25, 2021

Related U.S. Application Data

(63) Continuation of application No. PCT/EP2020/051796, filed on Jan. 24, 2020.

(30) Foreign Application Priority Data

Feb. 14, 2019  (EP) .................................... 19000086

(51) Int. Cl.
*H04W 72/23* (2023.01)
*H04L 5/00* (2006.01)
*H04W 72/0453* (2023.01)

(52) U.S. Cl.
CPC ....... *H04W 72/0453* (2013.01); *H04L 5/0094* (2013.01); *H04L 5/0098* (2013.01); *H04W 72/23* (2023.01)

(58) Field of Classification Search
CPC .......................... H04W 72/0453; H04W 72/23; H04L 5/0094; H04L 5/0098; H04L 5/0053
See application file for complete search history.

(56) References Cited

U.S. PATENT DOCUMENTS 10,736,135 B2 *  8/2020  Wang .................... H04W 72/21
2015/0131546 A1  5/2015  Seo et al.
(Continued)

FOREIGN PATENT DOCUMENTS

EP       2 822 339 A1      1/2015
WO    WO 2018084571 A1    5/2018
WO       2018/224042 A1   12/2018

OTHER PUBLICATIONS

3GPP TR 38.889 V1.0.0, "3rd Generation Partnership Project; Technical Specification Group Radio Access Network; Study on NR-based Access to Unlicensed Spectrum; (Release 16)," Nov. 2018, 120 pages.
(Continued)

*Primary Examiner* — Khaled M Kassim
*Assistant Examiner* — Hector Reyese
(74) *Attorney, Agent, or Firm* — Seed IP Law Group LLP

(57) ABSTRACT

The present disclosure provides a transceiver device and scheduling device, and communication methods for transceiver device and scheduling device. The transceiver device comprises a transceiver which, in operation, receives, over a physical downlink control channel (PDCCH), a sub-band occupancy indicator indicating sub-bands determined to be available for a transmission, and a resource allocation indicator indicating resources included in the available sub-bands and assigned to the transceiver device for the transmission. The transceiver device further comprises circuitry which, in operation, determines the assigned resources according to the resource allocation indicator and the sub-band occupancy indicator.

10 Claims, 7 Drawing Sheets

(56) References Cited

U.S. PATENT DOCUMENTS

| | | | |
|---|---|---|---|
| 2017/0347268 A1* | 11/2017 | Chen | H04L 5/0044 |
| 2020/0112484 A1* | 4/2020 | Sun | H04L 5/003 |
| 2020/0119894 A1 | 4/2020 | Jia et al. | |
| 2020/0382250 A1* | 12/2020 | Choi | H04L 5/0048 |
| 2024/0015746 A1* | 1/2024 | Khoshnevisan | H04W 72/23 |

OTHER PUBLICATIONS

3GPP TS 38.214 V15.4.0, "3rd Generation Partnership Project; Technical Specification Group Radio Access Network; NR; Physical layer procedures for data (Release 15)," Dec. 2018, 103 pages.

ETSI EN 301 893 V1.8.1, "Broadband Radio Access Networks (BRAN); 5 GHz high performance RLAN; Harmonized EN covering the essential requirements of article 3.2 of the R&TTE Directive," Mar. 2015, 93 pages.

Extended European Search Report, mailed Jul. 31, 2019, for corresponding European Application No. 19000086.9-1215, 9 pages.

International Search Report, mailed Mar. 26, 2020, for corresponding International Application No. PCT/EP2020/051796, 3 pages.

Itri, "DL control information to facilitate wideband operation in NR-U," R1-1900987, Agenda Item: 7.2.2.2.5, 3GPP TSG RAN WG1 Ad-Hoc Meeting 1901, Taipei, Taiwan, Jan. 21-25, 2019, 3 pages.

Panasonic, "COT structure indication," R1-1900258, Agenda Item: 7.2.2.1.2, 3GPP TSG-RAN WG1 Ad-Hoc Meeting 1901, Taipei, Taiwan, Jan. 21-25, 2019, 3 pages.

Japanese Notice of Reasons for Rejection, dated Nov. 14, 2023, for Japanese Patent Application No. 2021-547283. (9 pages) (with English translation).

Panasonic, "Wideband operation in NR unlicensed," R1-1900259, Agenda Item: 7.2.2.2.5, 3GPP TSG-RAN WG1 Ad-Hoc Meeting 1901, Taipei, Taiwan, Jan. 21-25, 2019. (4 pages).

European Communication, dated Mar. 13, 2024, for European Patent Application No. 20 701 082.8-1215. (6 pages)

* cited by examiner

TRANSCEIVER DEVICE AND SCHEDULING DEVICE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in spectrum ranging from sub-1 GHz to millimeter wave bands. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates providing flexible allocation of resources in an unlicensed carrier.

In an embodiment, the techniques disclosed herein feature a transceiver device comprising a transceiver which, in operation, receives, over a physical download control channel, PDCCH, a sub-band occupancy indicator indicating sub-bands determined to be available for a transmission, and a resource allocation indicator indicating resources included in the available sub-bands and assigned to the transceiver device for the transmission. The transceiver device comprises circuitry which, in operation, determines the assigned resources according to the resource allocation indicator and the sub-band occupancy indicator.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

Figure 1:
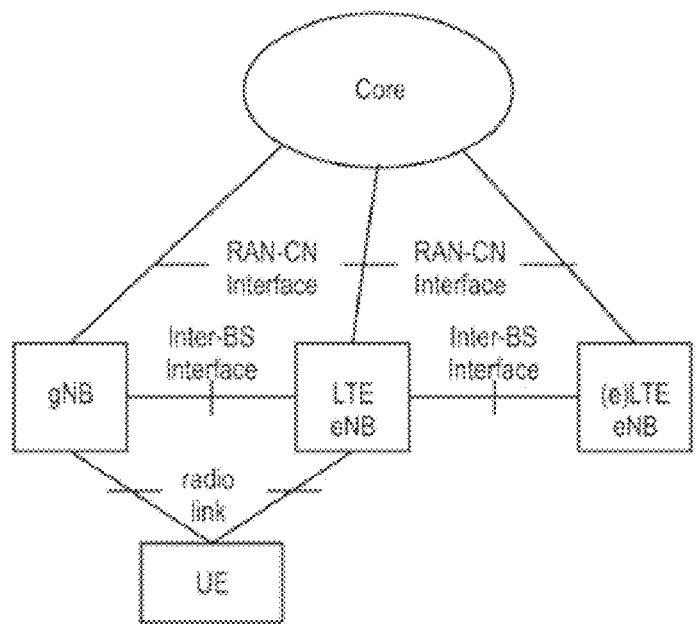
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP system such as NR and/or LTE and/or UMTS. For example, as illustrated in FIG. 1, the base station (BS) may be a gNB (gNodeB, e.g., an NR base station) or an eNB (eNodeB, e.g., an LTE base station). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. In NR, the physical layer is based on time-frequency resources (such as Orthogonal Frequency Division Multiplexing, OFDM, similar to LTE) and may support multiple antenna operation.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals.

In 3GPP, NR-based operation in an unlicensed spectrum (NR-U) is studied (see, e.g., 3GPP TR 38.889, Study on NR-based access to unlicensed spectrum, v1.0.0). NR-U may operate in a sub-7 GHz band at 5 GHz or 6 GHz. However, the present disclosure is not restricted to a particular band and may also be applied to a millimeter wave band at, e.g., 52 GHz.

Wideband operation in unlicensed spectrum is one of the building blocks for NR-U. For instance, NR-U may support the possibility to configure a serving cell with a bandwidth (within an unlicensed wideband carrier) which is larger than 20 MHz (see, FIG. 2). Moreover, if absence of transmissions by other radio access technologies (RATs) such as Wi-Fi cannot be guaranteed in the band where NR-U is operating, the NR-U operating bandwidth may be taken selected as a multiple of 20 MHz, such as 80 MHz shown in FIG. 2. Moreover, at least for a band where it is not possible to guarantee, e.g., by regulation, the absence of Wi-Fi or other competing systems, clear channel assessment, e.g., LBT (listen before talk) may be performed in units or frequency ranges of 20 MHz, as shown in FIG. 2.

The LBT procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively.

The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is classified as free, the device is allowed to transmit immediately. The maximum transmit duration is restricted in order to facilitate fair resource sharing with other devices operating on the same band.

Figure 2:
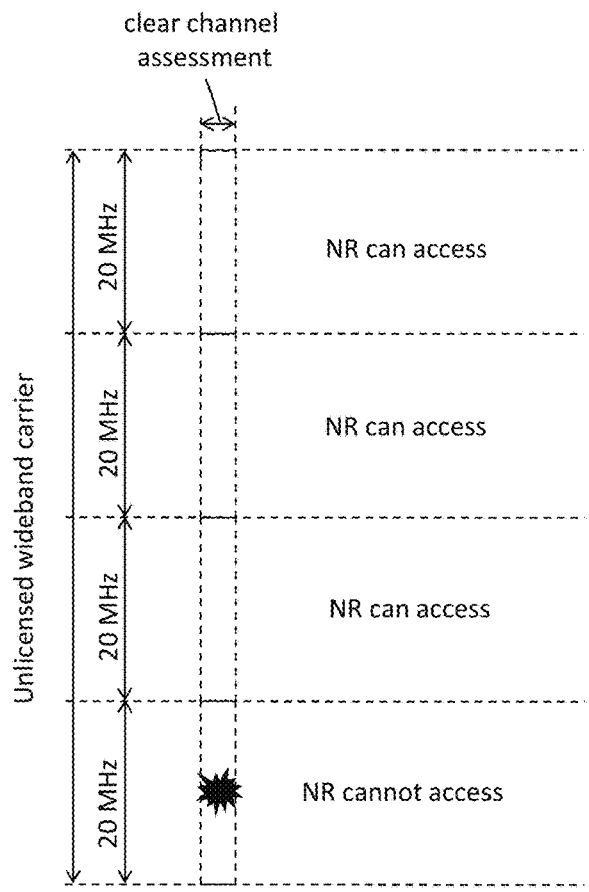
FIG. 2 is a schematic drawing showing clear channel assessment in an unlicensed wideband carrier.

As can be seen in FIG. 2, as a result of LBT clear channel assessment per respective 20 MHz frequency range, it can happen that some parts of the wideband carrier are blocked by Wi-Fi or other competing systems, but NR can nevertheless still use the free parts not used by the competing RAT(s). It may also happen that the blockage of certain parts of the wideband carrier is coming from the scheduling decision of NR gNB itself (regardless whether LBT is performed, or regardless of the LBT result if LBT is performed), e.g., to reserve some frequency resources.

Figure 3:
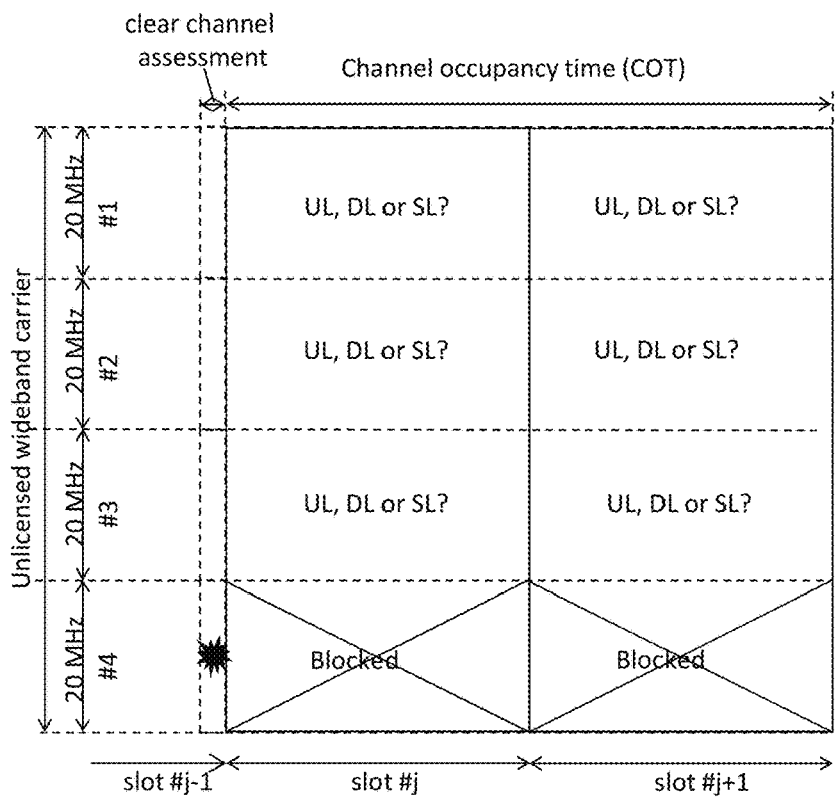
FIG. 3 is a schematic drawing showing channel occupation.

In unlicensed band operation, after acquiring the channel, an initiating device (e.g., a scheduling device such as an NR gNB) can occupy the channel up to a maximum channel occupancy time (COT). This is shown in FIG. 3

The initiating device (e.g., gNB) may share the acquired time-frequency resources with responding devices (e.g., one or more transceiver devices such as UEs). Sharing the acquired time-frequency resources may facilitate allowing flexible resource usage among uplink (UL), downlink (DL) or sidelink (SL), see FIG. 3. For instance, UL, DL and SL resources can be re-allocated based on the traffic demand in the respective directions.

Moreover, the sharing of the acquired resources may facilitate allowing UL or SL transmission without performing LBT in the gNB's acquired COT. In particular, if the gap between UL and DL or SL transmissions is sufficiently small (e.g., less than 16 µs), no LBT needs to be performed by a UE for UL or SL transmission directly following the DL burst, and LBT overhead may thus be reduced.

In addition, semi-statically configured or periodic reference signals, signaling, or data transmission can be made possible by sharing the acquired time-frequency resources. E.g., if semi-statically configured UL transmission configured by higher layers was within the gNB's COT, but no UL resources were shared by the gNB, then UL transmission would need to be dropped.

In FIG. 3, a COT stretching over 2 slots is merely shown for explanation. For instance, a maximum COT may be assumed to be 8 ms or 9 ms. E.g., for a subcarrier spacing of 15 kHz, a COT of 8 ms corresponds to 8 slots, and for a subcarrier spacing of 30 kHz, it corresponds to 16 slots. Moreover, in the example shown in FIG. 3, clear channel assessment is performed at the end of a slot (#j−1), and the COT starts with the first symbol of the slot preceding the slot in which the clear channel assessment is performed. However, different opportunities or time instances may be considered at which an initiating device may acquire the channel. E.g., opportunities may be at every second symbol or twice per slot.

In Release 15 of NR, two types of frequency domain resource allocation schemes, type 0 and type 1, are used, both signaling the allocation across the active bandwidth part (BWP)

Type 0 is a bitmap-based allocation scheme. The most flexible way of indicating the set of allocated resource blocks is to include a bitmap with size equal to the number of resource blocks in the BWP. A resource block corresponds to a smallest allocable unit for transmission of data and is defined by the number of subcarriers in frequency. (Note that the NR definition of a resource block differs from the LTE definition. An NR resource block is a one-dimensional measure spanning the frequency domain only, while LTE uses two-dimensional resource block of 12 subcarriers in frequency and one slot in time.) This would allow for an arbitrary combination of resource blocks to be scheduled for transmission but would, unfortunately, also result in a very large bitmap for the larger bandwidths. Therefore, the bitmap in type 0 resource allocation scheme is used to point not to individual resource blocks, but to groups of contiguous resource blocks, called RBG. The size of RBG depends on the size of active BWP. For instance, two different configurations are possible for each size of the BWPs, as defined by 3GPP TS 38.214 V15.4.0 and summarized in Table 1.

TABLE 1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

As can be seen from Table 1, for instance, a RBG allocated according to type 0 with the bandwidth size of a BWP corresponding to a number of RBs from 1 to 36 contains two RBs when applying configuration 1. Accordingly, for instance, a RBG allocated according to type 0 with a BWP size corresponding to a number of RBs from 73 to 144 contains 16 RBs when applying configuration 2. That is, the number of RBs within a RBG depends on the bandwidth of the active BWP.

Type 1 resource allocation scheme does not rely on a bitmap. Instead, it uses a resource indication value (MV), which encodes the resource allocation as a starting position and length of the allocation in terms of number of resource blocks. Thus, it does not support arbitrary allocation of resource blocks but only frequency-contiguous allocation, thereby reducing the number of bits required for signaling the resource block allocation.

Both resource allocation types refer to virtual resource blocks. For type 0, a non-interleaved mapping from virtual to physical resource block is used, meaning that the virtual resource blocks are directly mapped to the corresponding physical resource blocks. On the other hand, for type 1 resource allocation scheme, non-interleaved mapping is supported for UL. For DL, both interleaved and non-interleaved mapping is supported for type 1 resource allocation scheme, wherein the interleaving size is the bandwidth of the active BWP. The VRB-to-PRB mapping bit (if present, downlink only) indicates whether the allocation signaling uses interleaved or non-interleaved mapping.

Figure 4:
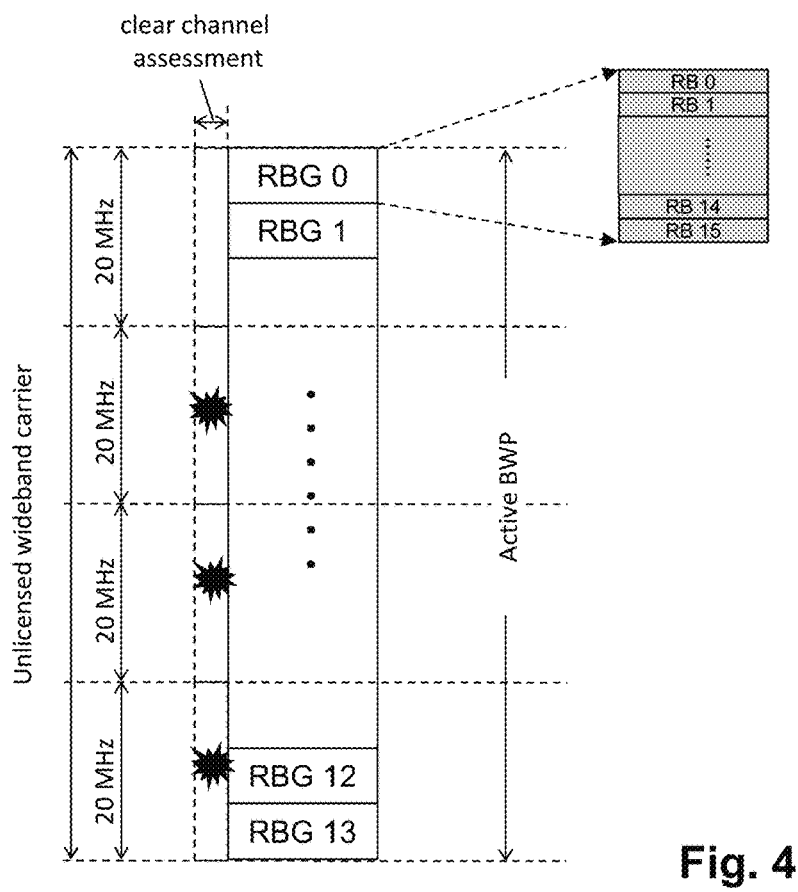
FIG. 4 shows an example illustration of type 0 resource allocation directly applied to NR-U wideband operation.

FIG. 4 shows an example illustration of type 0 resource allocation (RA) directly applied to NR-U wideband operation. As illustrated in FIG. 4, the active BWP includes four sub-bands, each of 20 MHz frequency range. Three of the illustrated sub-bands are determined not to be available for transmission, for instance, during clear channel assessment by LBT. Said non-available sub-bands are indicated by a star symbol in FIG. 4.

Since the size of the RBGs, that is, the number of virtual RBs within one RBG, depends on the active BWP, the granularity of RBGs may become too coarse with respect to the bandwidth of the available sub-bands if only a part of the active BWP is determined to be available. In the example shown in the figure, the active BWP may have a total of 220 virtual RBs (with 30 kHz subcarrier spacing), which results, according to Table 1, to a RBG size of 16 RBs. However, as only a single 20 MHz sub-band is available, the RBG granularity becomes too coarse, which limits the flexibility of resource allocation.

Figure 5:
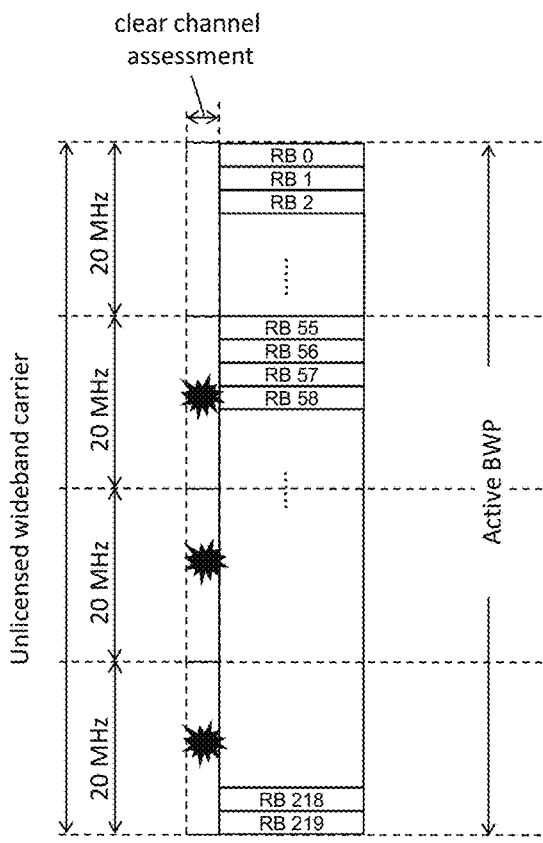
FIG. 5 shows an example illustration of type 1 resource allocation directly applied to NR-U wideband operation.

FIG. 5 shows an example illustration of type 1 RA directly applied to NR-U wideband operation for a case similar to the one illustrated in FIG. 4, wherein only part of the active BWP is determined as being available. In this case, when type 1 RA is applied, many RIV entries are not usable. In particular, in the example illustrated in FIG. 5, RIV entries indicating the starting positions from RB #55 with any length cannot be used.

Figure 6:
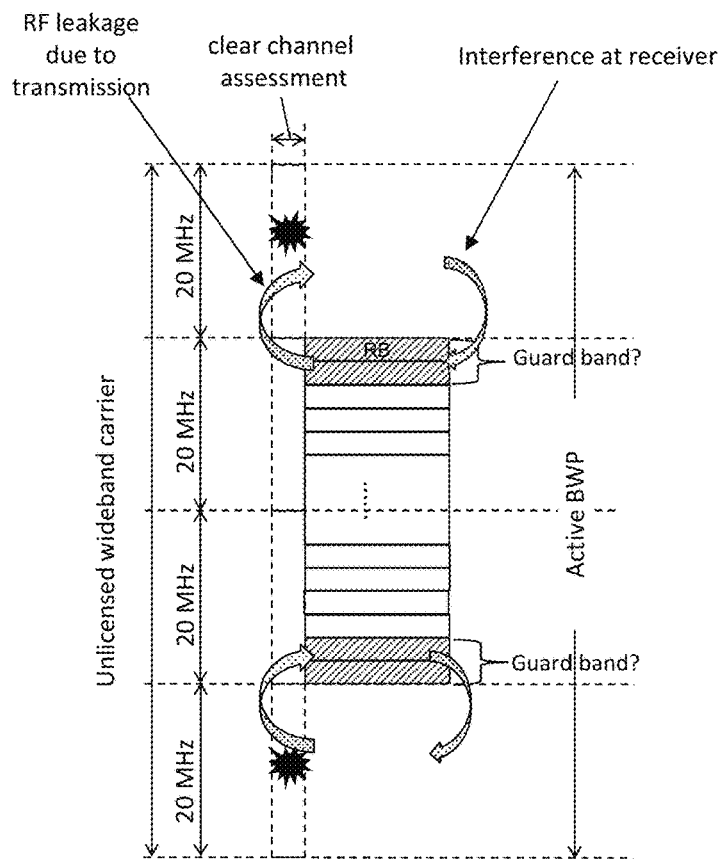
FIG. 6 is an illustration of a situation of wideband operation in unlicensed spectrum, wherein only part of the active BWP is determined as being available.

FIG. 6 illustrates a situation of wideband operation in unlicensed spectrum for NR-U, wherein only part of the active BWP is determined as being available. In order to compensate for RF leakage from and into sub-bands determined not to be available, guard band resources located between an available sub-band and a non-available sub-band, that is at the edges of contiguous sub-bands, may be employed. This is applicable for both to RA according to type 0 and type 1. In embodiments applying the guard bands, whether or not guard band resources between accessible (available) and inaccessible (non-available) sub-bands are inserted depends on the availability of sub-bands, which may be, for instance, determined as a result of clear channel assessment, for instance, by LBT.

A preferred RA granularity and preventing useless RIV entries could be achieved by changing the active BWP depending on the availability of sub-bands, for instance, as a result of clear channel assessment. However, switching the active BWP is associated with a delay not allowing for UE being scheduled during transition time. The present disclosure provides techniques to adapt the RA granularity and prevent useless RIV entries dynamically according to the availability of sub-bands, without the need of changing the active BWP.

Furthermore, in the-state-of-the-art mobile communication standards, e.g., LTE release 15 and NR release 15, the guard band is semi-statically configured to be present at the edges of a carrier. There lacks mechanism to dynamically generate guard band inside a carrier with flexible frequency position and size, e.g., to enable the guard band resources depending on the availability of sub-bands as shown in FIG. 6.

The present disclosure provides techniques which may facilitate for the available sub-bands being used in a flexible, efficient way in NR-U wideband operation. In particular, the present disclosure further provides techniques for preventing RF leakage from and into non-available sub-bands.

To enhance wideband operation, in the embodiments of communication methods and communication devices described in the following, an initiating device (scheduling device) indicates a sub-band occupancy indicator (SBOI) indicating sub-bands determined to be available for a transmission and a resource allocation indicator indicating resources included in the available sub-bands and assigned to a transceiver device for the transmission over a PDCCH to a transceiver device, which determines the assigned resources by interpreting the resource allocation indicator according to the SBOI.

Figure 7:
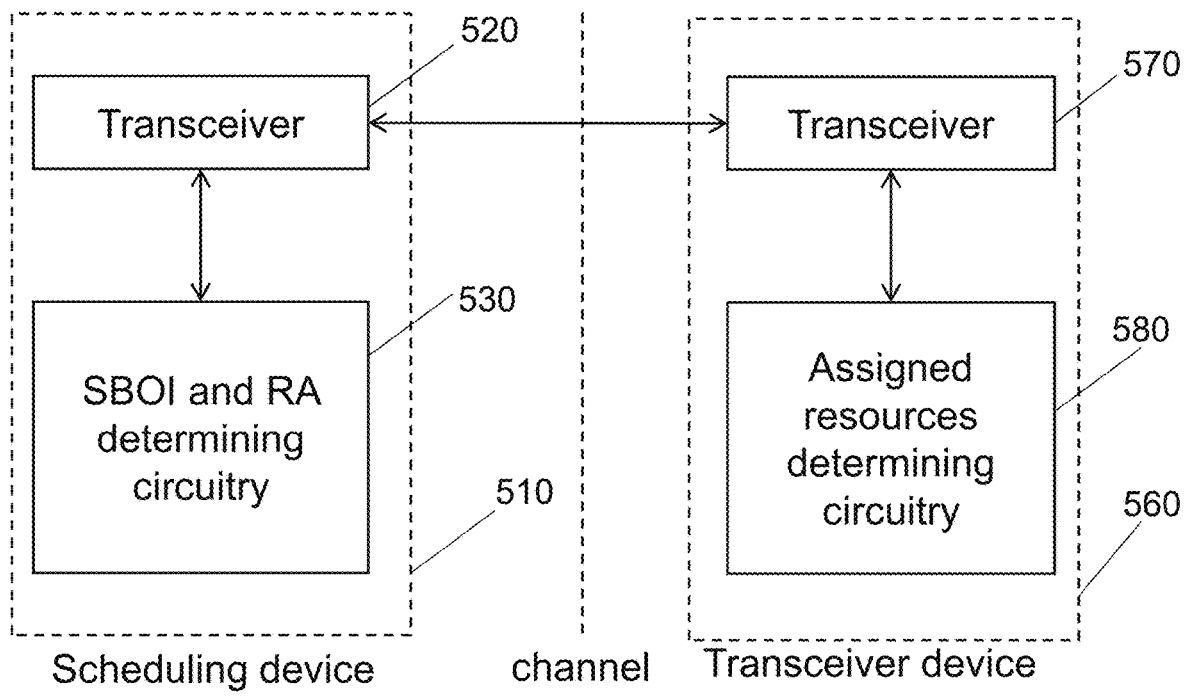
FIG. 7 is a block diagram showing the functional components of a scheduling device and a transceiver device according to an embodiment.

The disclosure provides a transceiver device and a scheduling device shown in FIG. 7. The transceiver device 560 comprises a transceiver 570 (a transmitter and/or receiver comprising hardware component(s) such as one or more antennas and control circuitry which controls operation of the hardware components) which, in operation, receives, over a PDCCH, the sub-band occupancy indicator indicating sub-bands determined to be available for a transmission, and a resource allocation indicator indicating resources in the available sub-bands and assigned to the transceiver device for the transmission. Further, the transceiver device 560 comprises circuitry 580 (or processing circuitry) which, in operation, determines the assigned resources according to the resource allocation indicator and the sub-band occupancy indicator (SBOI)

For instance, the transceiver device 560 is a UE of NR. Accordingly, the transceiver 570 and circuitry 580 are also referred to in this disclosure as "UE transceiver" and "UE circuitry." However, these terms are merely used to distinguish the circuitry 580 and transceiver 570 from circuitry and transceiver(s) comprised by other devices such as base stations. The transceiver device 560 may be a terminal device, relay device, or communication device of a similar communication system. The UE circuitry 580 may be considered or include "assigned resources determining circuitry."

Further provided is a scheduling device 510 (or scheduling node) shown in FIG. 7, comprising circuitry 530 which, in operation, determines the sub-band occupancy indicator indicating sub-bands determined to be available for a transmission, and a resource allocation indicator indicating resources included in the available sub-bands and assigned to the transceiver device for the transmission. The scheduling device further comprises the transceiver 520 which, in operation, transmits the sub-band occupancy indicator and the resource allocation indicator over PDCCH.

For instance, the scheduling device is a network node (base station) in an NR system (a gNB) or in a similar wireless communication system. The circuitry 530 is also referred to as "SBOI and RA determining circuitry" or, to distinguish it from other circuitry such as the UE circuitry 580, "network node circuitry."

Figure 8:
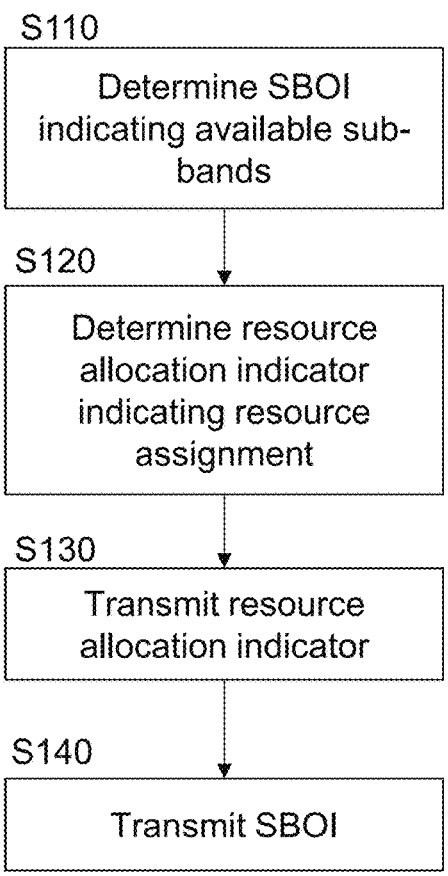
FIG. 8 is an illustration of the steps of a method for a scheduling device according to an embodiment.

Further provided is a method for a scheduling device (or scheduling node). As shown in FIG. 8, the method comprises the steps of determining S110 a SBOI indicating sub-bands determined to be available for a transmission, determining S120 a resource allocation indicator indicating resources included in the available sub-bands and assigned to a transceiver device for the transmission, transmitting S130, S140 the SBOI and the resource allocation indicator over a PDCCH.

Figure 9:
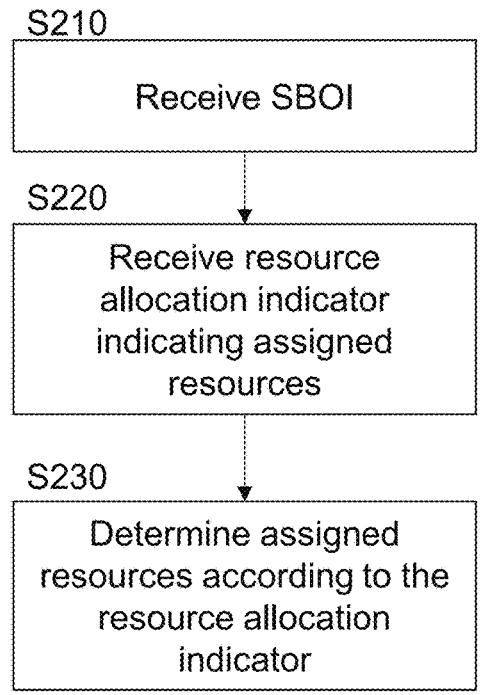
FIG. 9 is an illustration of the steps of a method for a transceiver device according to an embodiment.

Further provided is a method for a transceiver device. As shown in FIG. 9, the method comprises the steps of receiving S210 over a PDCCH, the SBOI indicating sub-bands to be available for a transmission, and receiving S220 the resource allocation indicator indicating resources included in the available sub-bands and assigned to a transceiver device for the transmission, and determining S230 the assigned resources according to the resource allocation indicator and the sub-band occupancy indicator.

In the further description, the details and embodiments apply to each of the transceiver device 560, the scheduling node (or scheduling device) 510, and the respective methods for the transceiver device and scheduling node unless explicit statement or the context indicates otherwise.

The scheduling node 510 transmits the SBOI and the resource allocation indicator to the transceiver device 560. The sub-bands indicated by the SBOI are available frequency ranges included in a carrier and available for transmission to be performed between the transceiver device and the scheduling device. The carrier may be an unlicensed carrier (or unlicensed wideband carrier). These available sub-bands are frequency ranges ((sub-)intervals, sub-bands, or partitions) within the unlicensed carrier which are not used by a competing RAT system (e.g., WiFI) for the duration of a slot or a COT comprising a plurality of slots. The sub-bands may respectively have an equal width. For instance, if the bandwidth within the carrier where the NR-U is operating is a multiple of 20 MHz, as mentioned above, the width of the sub-bands may be 20 MHz.

The available sub-bands are frequency ranges available for transmission performed between the transceiver device 560 and the scheduling node 510. This transmission may be an uplink transmission from the transceiver device 560 to the scheduling node 510 (the transceiver device 560 transmits and the scheduling node 510 receives) or a downlink transmission from the scheduling node 510 to the transceiver device 560 (the scheduling node 510 transmits and the transceiver device 560 receives) or a sidelink transmission between the transceiver device 560 and a second transceiver device different from the transceiver device (the transceiver device 560 transmits and the second transceiver device receives, or vice versa). Transceiver device 560 and scheduling node 510 communicate with each other via a wireless channel, in particular a channel in an unlicensed frequency band/carrier.

The sub-band occupancy indicator indicates the sub-bands, which are available for a transmission, for example, according to the results of clear channel assessment, e.g., LBT. For instance, a bit field in a group common PDCCH or UE-specific PDCCH may be defined for the SBOI.

The availability of sub-bands for a transmission is not limited to be determined according to a result of clear channel assessment, but may be the scheduler's decision to, for example, reserve some resources intentionally.

The scheduling node 510 assigns resources to the transceiver device for the transmission. In particular, the scheduling node 510 generates a resource allocation indicator, and transmits the indicator to the transceiver device 560, which receives the resource allocation indicator.

As mentioned, the carrier including the sub-bands may be an unlicensed carrier. E.g., the carrier may be shared by a first communication system such as NR or NR-U including the scheduling device 510 and the transceiver device 560, and a second communication system such as a WiFi system using the same or part of the unlicensed wideband carrier. The scheduling device 510 may further perform clear channel assessment to determine the available sub-bands currently unused by the second communication system and thus acquire the one or more available sub-bands for transmission(s) within a COT. For instance, the plurality of frequency ranges are a plurality of 20 MHz ranges. By acquiring the available sub-bands, the scheduling device 510 may be considered to initiate communication in the unlicensed wideband carrier and may be considered an initiating device. The scheduling device then, in step S110 determines the SBOI, for instance, based on the result of the clear channel assessment. In particular, the scheduling device selects one or more sub-bands from among the available sub-bands as the available sub-bands, and determines and generates the SBOI to be transmitted over a PDCCH.

For instance, the PDCCH indicating the available sub-bands is a group-common (GC) PDCCH which the scheduling device 510 transmits to a group of transceiver devices including transceiver device 560. Accordingly, the indicated available sub-bands are used by group of transceiver devices. The transceiver devices from among the group may be configured (e.g., by RRC) with a group-common RNTI (radio network temporary identifier) which the scheduling device 510 uses for scrambling the DCI (i.e., the CRC bits of the DCI) carried by the GC PDCCH. The transceiver devices descramble the DCI carried by the GC PDCCH using the group-common RNTI.

SBOI and Resource Allocation Transmission

In some embodiments, the SBOI is transmitted by the scheduling device 510 and received by the transceiver device 560 via a group-common PDCCH and the resource allocation indicator is transmitted by the scheduling device 510 and received by the transceiver device 560 via a PDCCH specific to the transceiver device.

In some embodiments, both the SBOI and the resource allocation indicator are transmitted by the scheduling device 510 and received by the transceiver device 560 via a PDCCH specific to the transceiver device.

In some embodiments, the available sub-bands are indicated explicitly. For instance, the PDCCH includes a bit field indicating the available sub-bands. Accordingly, the PDCCH carries an explicit indicator of the range (or ranges) within the (unlicensed) wideband carrier which are currently not used for communication. For instance, the bit field may be one of the following alternatives:

First Alternative: The available sub-bands are explicitly represented by a bitmap, where one bit in the bitmap represents an applicable range (e.g., a 20 MHz range).

Second alternative: The available sub-bands (the applicable portion of the unlicensed wideband carrier, provided it is contiguous) are represented by a starting position and a length of the applicable portion, wherein the length has a specified granularity such as 20 MHz.

A mixture of both or another signaling is also applicable, in general. In accordance with the first alternative, in some embodiments, the bit field (i.e., the SBOI) is a bitmap including a plurality of bits the bits of which correspond respectively to a plurality of sub-bands (such as 20 MHz ranges) included in the carrier. The bitmap indicates whether or not a (respective) range from among the plurality of ranges is available for the transmission. In particular, a bit in the bitmap (or each bit in the bitmap) indicates whether or not a corresponding sub-band is available for the transmission to be performed.

In the example shown in FIG. 2, the unlicensed wideband carrier of width 80 MHz is subdivided into four 20 MHz sub-bands. The gNB (or similar scheduling device 510) may perform clear channel assessment (LBT) to determine respectively the availability of the 20 MHz ranges. For instance, the scheduling device 510 succeeds over frequency ranges (20 MHz (sub-)bands) #1, #2, and #3, (determines ranges #1-#3 to be available) but fails for frequency range #4 (i.e., determines that frequency is blocked/used by another system/RAT and therefore not available).

The scheduling device 510 generates a bitmap which indicates the applicable frequency range, e.g., "0111." Therein, frequency range #1 corresponds to the least significant bit. However, the disclosure is not limited thereto, and the bitmap may also, for instance, be "1110."

The scheduling device 510 may then send a PDCCH including the bitmap indicator (the SBOI) of the available sub-bands to the transceiver device or the group of transceiver devices (if transmitted via a GC PDCCH) which are to perform the communication with the scheduling device.

In the case of the SBOI being transmitted via a GC PDCCH, a UE (or other transceiver device 560 UE) monitors the GC PDCCH according to a search space configuration provided by RRC)). The configuration of the search space for monitoring the GC PDCCH includes both time and frequency domain configurations. In time domain, it configures the monitoring periodicity such as once per slot or multiple times per slot, and the monitoring offset indicating which symbol(s) UE should monitor. In frequency domain, the configuration instructs the UE the frequency domain resources for monitoring the (GC) PDCCH. Such frequency domain resources can be located within one 20 MHz sub-band or multiple 20 MHz sub-bands. It may be determined by the scheduling device 510 in based on statistics regarding the blocking of the respective sub-bands. Accordingly the search space may be configured in a sub-band where blockage by other systems is less or least like to occur, in order to facilitate reliable reception of the GC PDCCH by the UE. If such statistics information is not available, and/or in order for the scheduling device 510 to maximize the successful rate of delivering (GC) PDCCH containing SBOI, the transceiver device 560 (UE) can be configured to monitor (GC) PDCCH over all 20 MHz sub-bands.

In the case of the SBOI being transmitted via a PDCCH specific to the transceiver device, the transceiver device acquires the SBOI, for instance, from the scheduling DCI within the PDCCH specific to the transceiver device.

In the above example, the available sub-bands are indicated by the SBOI being a bit-map comprising bits corresponding to the sub-bands in accordance with the above alternative 1. However, the availability or applicability of the sub-bands may also be signaled (by gNB) and determined by an indicator of a starting position and a length of an applicable part of the unlicensed carrier in accordance with the second alternative.

Accordingly, in some embodiments, the available sub-bands are included in a contiguous set of available sub-bands and the bit field indicates a starting position of the contiguous set of sub-bands and a length of the contiguous set of applicable frequency ranges. For instance, for the case of a 80 MHz wideband carrier subdivided into 20 MHz frequency ranges, two bits may indicate the starting position (or starting frequency range) of the set of applicable frequency ranges, and two further bits may indicate the length in units of available (20 MHz) sub-bands. In the example shown in FIG. 2, the starting position is frequency range 1 (represented by two bits, e.g., as "00"), and the length of the applicable set of ranges is 3 (represented by "10"). Such an applicable contiguous set of frequency ranges may be signaled by a bit field "0010." The case of no available sub-band (the whole carrier blocked) may be indicated by an "impossible" combination such as "1111" (an applicable set of ranges of length 4 starting at frequency range position #4). In another example, the starting position and the length can be jointly encoded, instead of having two separate bit fields. For the above-mentioned case where an 80 MHz wideband carrier subdivided into four 20 MHz sub-bands, the following encoding table can be used.

TABLE 2

| Code point | Starting sub-band | Length (number of sub-bands) |
|---|---|---|
| 0 | 0 | 1 |
| 1 | 1 | 1 |
| 2 | 2 | 1 |
| 3 | 3 | 1 |
| 4 | 0 | 2 |
| 5 | 1 | 2 |
| 6 | 2 | 2 |
| 7 | 0 | 3 |
| 8 | 1 | 3 |
| 9 | 0 | 4 |
| 10-15 | reserved | reserved |

Compared to having two separate bit fields, the joint encoding method as exemplified in Table 2 can save signaling overhead when the number of sub-bands increases.

As described above, if a certain (20 MHz) sub-band included in the unlicensed carrier is indicated as available (by an SBOI according to the first or second alternative) the UE follows a resource allocation determination rule determining the resources assigned to the UE obtained from a resource allocation indicator from a further channel (e.g., in a scheduling DCI if the transmission is dynamically scheduled). If a certain sub-band is indicated unavailable, the UE neither receives nor transmits over this unavailable sub-band even if the resource allocation indicator indicates a resource within the sub-band as being assigned to the UE.

In some embodiments, the resource allocation indicator indicates virtual RBs as the resources assigned to the transceiver device 560 based on the available sub-bands indicated by the SBOI. Then the virtual RBs are mapped to physical RBs with or without interleaving.

Type 0 RA

Figure 10:
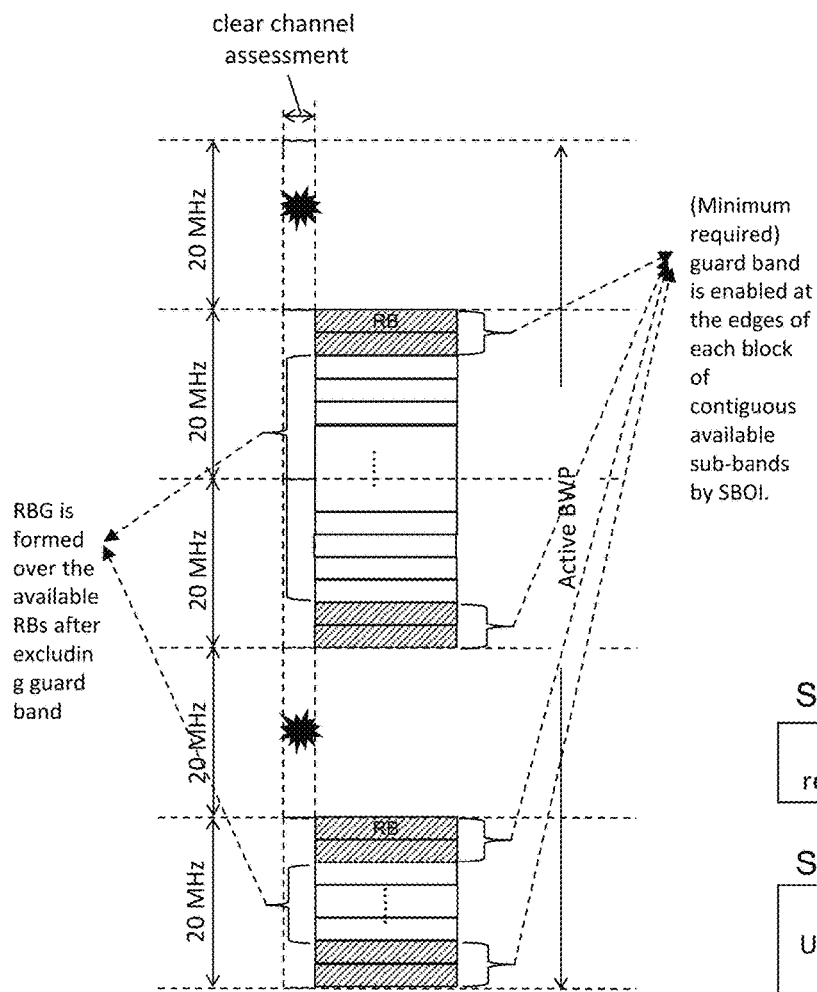
FIG. 10 is a schematic drawing showing resource assignment according to type 0 according to an embodiment wherein resource block group assignment is performed over the union of available sub-bands excluding guard bands.

In some embodiments, the resource allocation indicator indicates RBs assigned to the transceiver device 560 within the available sub-bands excluding guard bands at edges of one or more contiguous available sub-bands In some embodiments, in a case where RA is performed by the scheduling device according to type 0, an amount of guard may be semi-statically configured to the transceiver device, but the location of guard band is to be determined (dynamically, e.g., according to LBT result). The amount of guard may correspond to the minimum guard requirement to prevent RF leakage from and into non-available sub-bands. The scheduling device (e.g., gNB in NR-U) determines the SBOI, for instance, as a result of LBT, indicating the available sub-bands and derives the RBG size in terms of numbers of RBs within a single RBG considering only the bandwidth of the available sub-bands excluding guard bands located between an available sub-band and a non-available sub-band, wherein the bandwidth of the guard bands may be defined in terms of RBs within a guard band, as illustrated in FIG. 10. The number of RBs per RBG may be determined according to Table 1, for instance, wherein the bandwidth part size is replaced by the bandwidth of the union of available sub-bands excluding the guard bands. The RBGs are formed over the available RBs after excluding the guard bands. Subsequently, the scheduling device indicates the available sub-bands to the transceiver device UE over a PDCCH.

Figure 11:
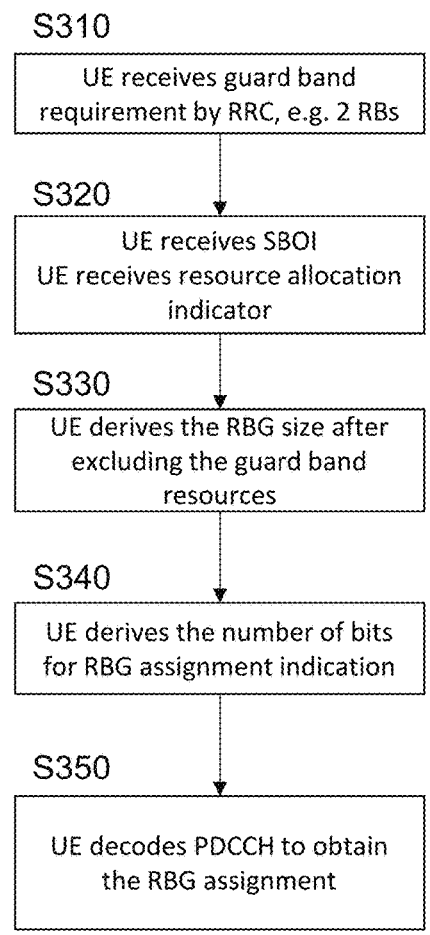
FIG. 11 is an illustration of a method for a transceiver device according to an embodiment.

As shown in FIG. 11, the transceiver device receives S310 the guard band requirement, for instance, by RRC, as, for example, two guard band RBs. Further, the transceiver device (UE) receives S320 the SBOI, for instance, via a GC PDCCH and the resource allocation indicator, for instance, via a PDCCH specific to the transceiver device and derives S330 the RBG size after excluding the guard band RBs, for instance, according to Table 1, wherein the bandwidth part size is replaced by the bandwidth of the union of available sub-bands excluding the guard bands. Based thereon, the receiver derives S340 the number of bits for the resource allocation indicator. Subsequently, the transceiver device decodes S350 the resource allocation indicator to obtain the RBG assignment.

As the RBG size is determined based on the union of available sub-bands indicated by the SBOI and excluding guard band RBs, the granularity of RA is improved in a case where only a part of the active BWP is available.

If the SBOI is transmitted via a GC PDCCH, the transceiver device (UE) may use the information on available sub-bands to determine the bitmap size of the resource allocation indicator, or simply assumes a fixed size. If the SBOI is transmitted via a PDCCH specific to the UE, a fixed bitmap size may be used, e.g., 18 bits.

As an alternative to the RBG size being determined based on the union of available sub-bands, as exemplified above, the RBG size may be configured to be equal to the configured guard band size (in terms of number of RBs) in a case where RA is performed by the scheduling device according to type 0 and the amount of guard is semi-statically configured to the transceiver device. It is a particular advantage of this approach that the guard band resources can be generated by one RBG.

In either case described above, additional guard band resources may be generated by avoiding assigning RBGs to the UEs in the resource allocation indicator, for instance, in scheduling DCI.

Figure 12:
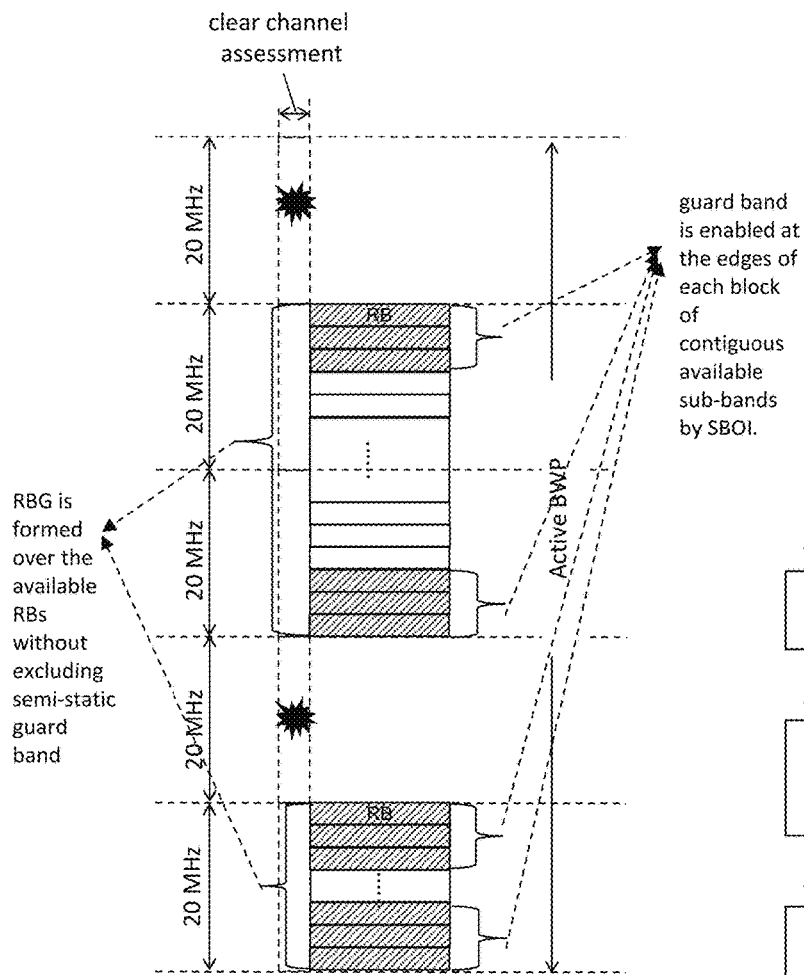
FIG. 12 is a schematic drawing showing resource assignment according to type 0 wherein resource block group assignment is performed over the union of available sub-bands including guard bands according to an embodiment.

In some embodiments, in a case where RA is performed by the scheduling device according to type 0, an amount of guard may be semi-statically configured to the transceiver device, which may correspond to a worst case guard requirement to prevent RF leakage from and into non-available sub-bands. But the location of the guard band is to be determined (dynamically, e.g., according to LBT result). The scheduling device (e.g., gNB in NR-U) determines the SBOI, for instance, as a result of the LBT, indicating the available sub-bands and derives the RBG size in terms of numbers of RBs within a single RBG considering only the bandwidth of the available sub-bands including guard bands located between an available sub-band and a non-available sub-band, as illustrated in FIG. 12. The number of RBs per RBG may be determined according to Table 1, for instance, wherein the bandwidth part size is replaced by the bandwidth of the union of available sub-bands without excluding the guard bands. Then the RBGs are formed over the available RBs without excluding the guard bands. Subsequently, the scheduling device indicates the available sub-bands to the transceiver device UE over SBOI. Further, guard bands at the edges of each block of contiguous available sub-bands are enabled with the size equal to the semi-statically configured value, meaning that the RBs within the guard bands are not used for a transmission in order to prevent RF leakage into or from the non-available sub-bands.

Figure 13:
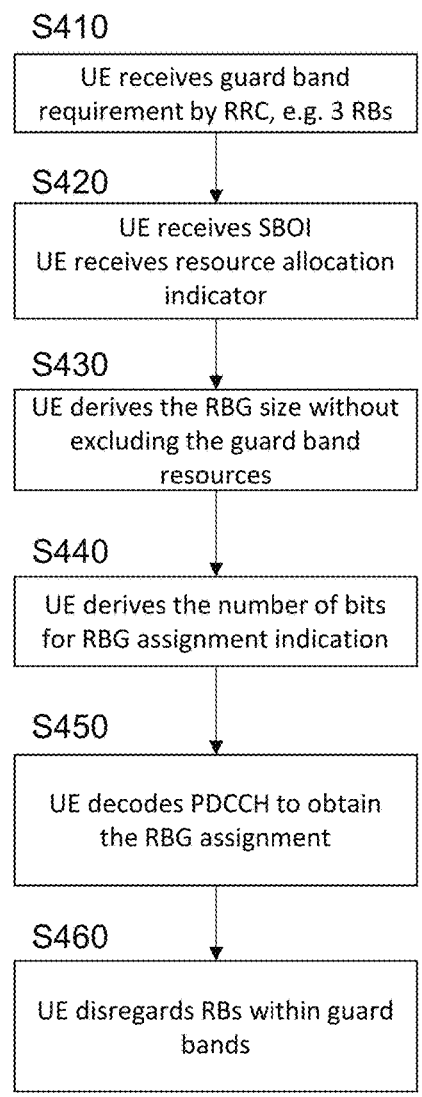
FIG. 13 is an illustration of a method for a transceiver device according to an embodiment.

As shown in FIG. 13, the transceiver device receives S410 the guard band requirement, for instance, by RRC, as, for example, three guard band RBs. Further, the transceiver device (UE) receives S420 the SBOI, for instance, via a GC PDCCH and the resource allocation indicator, for instance, via a PDCCH specific to the transceiver device and derives S430 the RBG size without excluding the guard band RBs, for instance, according to Table 1, wherein the bandwidth part size is replaced by the bandwidth of the union of available sub-bands without considering the existence of any guard bands. Based thereon, the receiver derives S440 the number of bits for the resource allocation indicator. Subsequently, the transceiver device decodes S450 the resource allocation indicator to obtain the RBG assignment. Further, during data transmission, UE can recognize that the guard band resources are needed at the edges of contiguous available sub-bands thanks to the SBOI, therefore, resource blocks within the guard bands at edges of contiguous available sub-bands are disregarded S460 even if said guard band RBs are assigned to the transceiver device according to the resource assigned according to the resource allocation indicator. As a result, there is no ambiguity whether guard band resources should be assumed by the UE or not.

The important feature of such design as explained above using FIGS. 12 and 13, compared to embodiments explained earlier (see FIGS. 10 and 11), include that the RBG size determination is decoupled from guard band specifications. Therefore, the resource allocation indicator design can be performed without taking into consideration of the guard band. Similar to what has been described in FIGS. 10 and 11, as the RBG size is determined based on the union of available sub-bands indicated by the SBOI, the granularity of RA is improved in a case where only a part of the active BWP is available.

If the SBOI is transmitted via a GC PDCCH, the transceiver device (UE) may use the information on available sub-bands to determine the bitmap size of the resource allocation indicator, or simply assumes a fixed bitmap size. If the SBOI is transmitted via a PDCCH specific to the UE, a fixed bitmap size may be used, e.g., 18 bits.

In some embodiments, in a case where RA is performed by the scheduling device according to type 0, an amount of guard may be semi-statically configured to the transceiver device, which may correspond to a worst case guard requirement. But the location of the guard band is to be determined (dynamically, e.g., according to LBT result). The scheduling device (e.g., gNB in NR-U) determines the SBOI, for instance, as a result of the LBT, indicating the available sub-bands. However, the RBG size in terms of numbers of RBs within a single RBG is determined considering only the bandwidth of a single available sub-bands even if more than one sub-bands are available. Consequently, RBG allocation is indicated with respect to a single sub-band within the resource allocation indicator transmitted to the transceiver device.

In case that more than one sub-bands are available, the RBG assignment within said single sub-band is subsequently applied by the scheduling device and the transceiver device to all available sub-bands. That is, RBG assignment is determined to be equal for equivalent RBs within different sub-bands.

One advantage of such resource allocation scheme is that the bitmap size of the resource allocation indicator may be significantly reduced as it refers to allocation of RBGs within a single sub-band only. Because of this, a constant bitmap size can be achieved regardless of the number of available sub-bands or the bandwidth of active BWP. For instance, consider an 80 MHz wideband carrier operation using 30 KHz subcarrier spacing. The RBG size can be determined considering only one 20 MHz, in this example, 55 RBs. According to the said exemplified Table 1, RBG size can be determined to contain 4 RBs (see configuration 1). As a result, the bitmap size is ceil(55/4)=14 bits. This 14-bit bitmap indication is used no matter the available sub-bands are 20 MHz, 40 MHz, 60 MHz, or 80 MHz.

Regarding the guard band generation, similar mechanism to what has been described using FIGS. 12 and 13 can be adopted. More specifically, guard bands at the edges of each block of contiguous available sub-bands are enabled with the size equal to the semi-statically configured amount, meaning that the RBs within the guard bands are not used for a transmission in order to prevent RF leakage into or from the non-available sub-bands.

Further, at the transceiver device (e.g., UE) side, after receiving SBOI, UE is informed the available and non-available sub-bands. With this information, UE is able to recognize that the guard band resources are needed at the edges of contiguous available sub-bands, therefore, resource blocks within the guard bands at edges of contiguous available sub-bands are disregarded even if said guard band RBs are assigned to the transceiver device according to the resource assigned according to the resource allocation indicator. As a result, there is no ambiguity whether guard band resources should be assumed by the UE or not.

Type 1 RA

Figure 14:
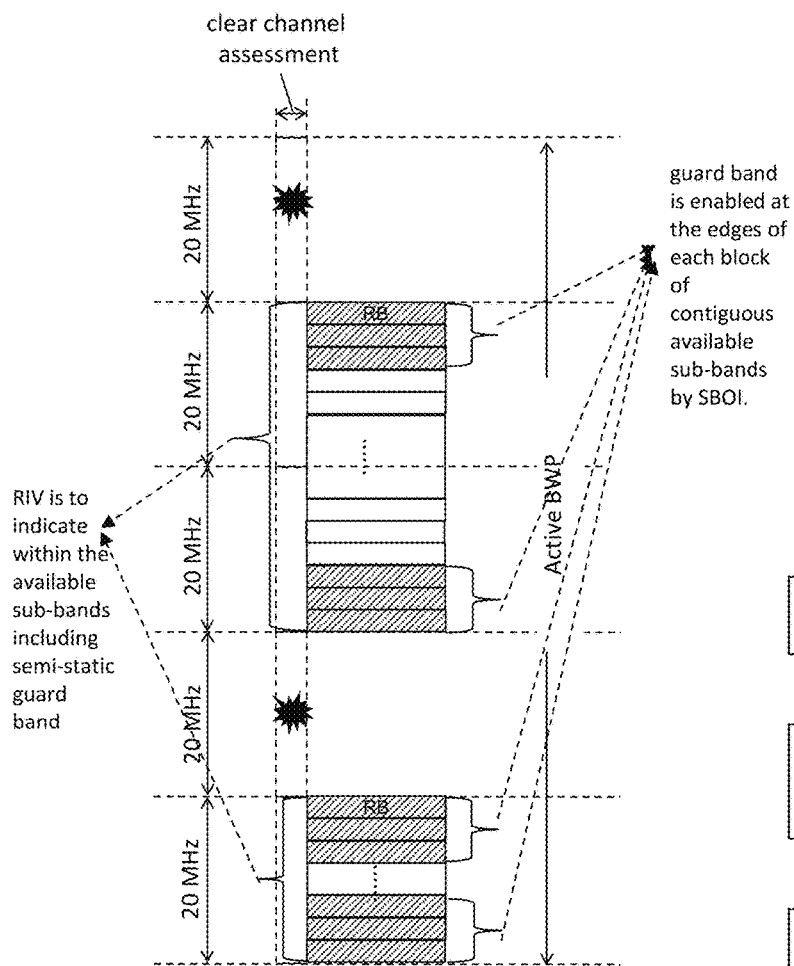
FIG. 14 is a schematic drawing showing resource assignment according to type 1 wherein resource block group assignment is performed over the union of available sub-bands including guard bands according to an embodiment.

In some embodiments, in a case where RA is performed by the scheduling device according to type 1, an amount of guard may be semi-statically configured to the transceiver device, which may correspond to a worst case guard requirement. But the location of the guard band is to be determined (dynamically, e.g., according to LBT result). The scheduling device (e.g., gNB in NR-U) determines the SBOI, for instance, as a result of the LBT and indicates the available sub-bands to the transceiver device by the SBOI. The MV has one RB granularity and is indicated with respect to the union of available sub-bands without exclusion of any guard bands, as illustrated in FIG. 14. If interleaving is applied for mapping onto physical RBs, the interleaving size is the whole union of available sub-bands in order to maximize the diversity. Subsequently, the scheduling device indicates the available sub-bands to the transceiver device UE by SBOI. Further, guard bands at the edges of each block of contiguous available sub-bands are enabled with the size equal to the semi-statically configured value, meaning that the RBs within the guard bands are not used for a transmission in order to prevent RF leakage into or from the non-available sub-bands.

Figure 15:
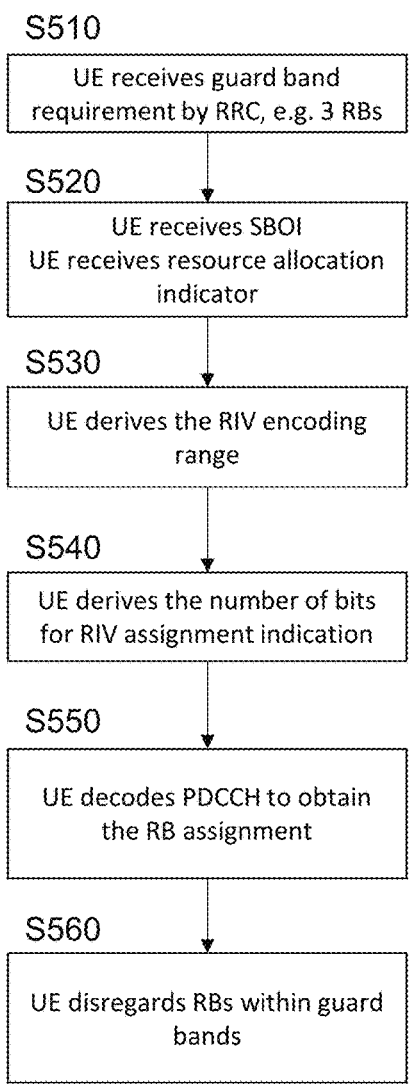
FIG. 15 is an illustration of a method for a transceiver device according to an embodiment in a case where RA type 1 is applied.

As shown in FIG. 15, the transceiver device receives S510 the guard band requirement, for instance, by RRC, as, for example, three guard band RBs. Further, the transceiver device (UE) receives S520 the SBOI, for instance, via a GC PDCCH and the resource allocation indicator, for instance, via a PDCCH specific to the transceiver device and derives S530 the RIV encoding range without considering any guard band RBs. Further, the transceiver device derives S540 the number of bits for RIV assignment indication and decodes S550 the resource allocation indicator to obtain the RB assignment. Further, thanks to the SBOI, the transceiver device is able to recognize the location of the guard band, which is at the edges of each block of contiguous available sub-bands. Therefore, the RBs within the guard bands are disregarded (assuming no data is carried by those RBs) in order to prevent RF leakage into or from the non-available sub-bands even if said RBs are assigned to the receiver device according to the resource allocation indicator.

In some embodiments, in a case where RA is performed by the scheduling device according to type 1, an amount of guard may be semi-statically configured to the transceiver device, which may correspond to a minimum guard requirement. But the location of the guard band is to be determined (dynamically, e.g., according to LBT result). The scheduling device (e.g., gNB in NR-U) determines the SBOI (and hence the location of the guard band), for instance, as a result of LBT and indicates the available sub-bands to the transceiver device. The RIV has one RB granularity and is indicated with respect to the union of available sub-bands excluding the (minimum) guard bands at the edges. In a case where non-interleaving mapping is performed between virtual RBs and physical RBs, the guard band may be generated by RA itself, as the RIV has one RB granularity. In the case where interleaving mapping is applied, the interleaving size is the entire union of available sub-bands excluding the guard bands at the edges of contiguous available sub-bands. In either case, the amount of guard band, i.e., the size of the guard bands, which may be expressed as a number of RBs within the guard bands, may be generating without wasting resources, if more guard band resources than the semi-static configured minimum amount are needed, due to one RB granularity of the RIV.

In some embodiments, in a case where RA is performed according to type 1, an amount of guard may be semi-statically configured to the transceiver device, which may correspond to a worst-case requirement. However, the location of the guard band is to be determined (dynamically, e.g., according to LBT result). The SBOI is determined (and hence the location of the guard band), for instance, as a result of LBT, and transmitted to the transceiver device. The granularity of the RIV may depend on the number of available sub-bands, which may be determined from results of LBT. For example, the granularity may be one RB in a case of one available sub-bands, two RBs in a case of two available sub-bands, three RBs in a case of three available sub-bands, and so on. In the following, one-RB and two-RB granularity of RIV encoding are provided as examples in Tables 3 and 4:

TABLE 3

One-RB Granularity

| Code point | Starting RB (every RB) | Length (number of RBs) |
|---|---|---|
| 0 | 0 | 1 |
| 1 | 0 | 2 |
| 2 | 0 | 3 |
| ... | ... | ... |
| 14 | 1 | 1 |
| 15 | 1 | 2 |
| ... | ... | ... |

TABLE 4

Two-RB Granularity

| Code point | Starting RB (every two RBs) | Length (number of RBs) |
|---|---|---|
| 0 | 0 | 2 |
| 1 | 0 | 4 |
| ... | ... | ... |
| 2 | 0 | 6 |
| 14 | 2 | 2 |
| 15 | 2 | 4 |
| ... | ... | ... |

The embodiment, however, is not limited to this particular dependency of the granularity of RIV on the number of available sub-bands, and the granularity may reflect any dependency on the available sub-bands. The RIV is indicated with respect to the union of the available sub-bands without excluding any guard bands and, if interleaving is applied, the interleaving size is the entire union of available sub-bands. With this approach, the diversity if maximized. The guard band, the amount of which is semi-statically configured but the location of which is determined dynamically at the edges of each block of contiguous sub-bands, is not used for data transmission and hence the transceiver device disregards any RB within the guard-bands even in a case where said RBs are assigned to the transceiver device according to RA within the resource allocation indicator.

One advantage of this approach is that the RIV overhead is fixed regardless of the number of available sub-bands. Consider an example of 80 MHz wide band operation at 30 KHz subcarrier spacing, where one sub-band has 20 MHz bandwidth. Consequently, one sub-band has 55 RBs. If the granularity of RIV increases in proportion to the increase of number of available sub-bands, the number of encoding bits for RIV becomes a fixed value as ceil(log 2(55×56/2))=11 bits. As a result, decoding a scheduling DCI is possible without the knowledge of the amount of available sub-bands.

If SBOI is sent via a GC PDCCH, the transceiver device may determine the size of the MV before receiving the scheduling DCI, or simply assumes a fixed size such as 11 bits If, however, SBOI is transmitted via a PDCCH specific to the transceiver device, the transceiver device may assume a fixed size.

In some embodiments, in a case where RA is performed according to type 1, an amount of guard may be semi-statically configured to the transceiver device, which may correspond to a worst-case requirement. But the location of the guard band is to be determined (dynamically, e.g., according to LBT result). The available sub-bands are determined (and hence the location of guard bands) and informed to the transceiver device by SBOI. The granularity of RIV is set to one RB and the RIV is indicated with respect to a single available sub-band, for instance, one of single available 20 MHz sub-bands, even if more than one sub-bands are available. If interleaving is applied when mapping from virtual RBs to physical RBs, the interleaving size is set to the size of one available sub-bands, for instance, to 20 MHz, regardless of the number of available sub-bands. Guard bands at the edges of contiguous available sub-bands are not used for the transmission and the transceiver device disregards and RB within the guard bands even if said RBs are assigned to the transceiver device according to RA in the resource allocation indicator.

When determining the resources assigned to the transceiver device, the transceiver device determines the resource assignment according to the single available sub-band from the resource allocation indicator. In case there are more than one sub-bands are available, the determined RB assignment is subsequently applied by the transceiver device to all available sub-bands. That is, RB assignment is determined to be equal for equivalent RBs within different sub-bands. Accordingly, the bit for RIV indication of the resource allocation indicator may be significantly reduced as it refers to allocation of RBs within a single sub-band only.

In particular, if the SBOI is transmitted via a GC PDCCH, the transceiver device may determine the RIV size based on the available sub-bands according to received SBOI, or simply assumes a fixed size, e.g., 11 bits. If the SBOI is transmitted via PDCCH specific to the transceiver device, the transceiver device may apply a fixed size.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

As described above, provided are devices and methods enabling efficient and flexible resource allocation in NR-U (or similar wireless communication systems operating in an unlicensed carrier).

Provided is a transceiver device, comprising a transceiver which, in operation receives, over a physical downlink control channel, PDCCH, a sub-band occupancy indicator indicating sub-bands determined to be available for a transmission and a resource allocation indicator indicating resources included in the available sub-bands and assigned to the transceiver device for the transmission, and circuitry which, in operation determined the assigned resources according to the resource allocation indicator and the sub-band occupancy indicator.

In some embodiments, the transceiver, in operation, receives: the sub-band occupancy indicator via a group-common PDCCH and the resource allocation indicator via a PDCCH specific to the transceiver device, or both the sub-band occupancy indicator and the resource allocation indicator via a PDCCH specific to the transceiver device.

In some embodiments, the sub-band occupancy indicator indicates the sub-bands determined to be available for a transmission according to a result of clear channel assessment.

In some embodiments, the resource allocation indicator indicates resource blocks as the resources assigned to the transceiver device based on the available sub-bands indicated by the sub-band occupancy indicator.

For example, the resource allocation indicator indicates resource blocks assigned to the transceiver device within the available sub-bands excluding guard bands at edges of one or more contiguous available sub-bands.

In some embodiments, the circuitry, in operation, disregards a plurality of resource blocks as guard band resource blocks at edges of one or more contiguous available sub-bands even if said guard band resource blocks are assigned to the transceiver device according to the resource allocation indicator.

In some embodiments, the resource allocation indicator indicates the resource blocks assigned to the transceiver device by a bitmap indicating resource block groups, each resource block group including at least one resource block within the available sub-bands excluding the guard bands; and the circuitry, in operation, determines the number of resource blocks within one of the resource block groups according to the total number of resource blocks within the union of the available sub-bands excluding the guard bands.

In some embodiments, the resource allocation indicator indicates the resource blocks assigned to the transceiver device by a bitmap indicating resource block groups, each resource block group including at least one resource block within the available sub-bands excluding the guard bands; and the circuitry, in operation, determines the number of resource blocks within one of the resource block groups as equal to the number of guard band resource blocks within each of the guard bands.

In some embodiments, the resource allocation indicator indicates the resource blocks assigned to the transceiver device by a bitmap indicating resource block groups, each resource block group including at least one resource block within the available sub-bands; and the circuitry, in operation, determines the number of resource blocks within each of the resource block groups according to the total number of resource blocks within the union of available sub-bands In some embodiments, the resource allocation indicator indicates the resource blocks assigned to the transceiver device by a bitmap indicating resource block groups within a single available sub-band from the available sub-bands, each resource block group including at least one resource block within said single available sub-band; and the circuitry, in operation, determines the number of resource blocks within one of the resource block groups according to the total number of resource blocks within the single available sub-band, and determines resource block group assignments of the other available sub-bands as equal to the resource block group assignments of the single available sub-band.

In some embodiments, the resource allocation indicator indicates the resource blocks assigned to the transceiver device by a resource indication value indicating a starting resource block and a length in terms of continuously assigned resource blocks.

In some embodiments, the resource allocation indicator indicates the resource blocks assigned to the transceiver device by a resource indication value indicating a starting resource block and a length in terms of continuously assigned resource blocks within the available sub-bands with an increment in the length depending on the number of available sub-bands.

In some embodiments, the resource allocation indicator indicates the resource blocks assigned to the transceiver device by a resource indication value indicating a starting resource block and a length in terms of continuously assigned resource blocks within a single available sub-band from among the available sub-bands; and the circuitry, in operation, determines resource block assignments of the other available sub-bands as equal to the resource block assignments of the single available sub-band.

Further provided is a scheduling device, comprising circuitry which, in operation, determines a sub-band occupancy indicator indicating sub-bands determined to be available for a transmission, a resource allocation indicator indicating resources included in the available sub-bands and assigned to a transceiver device for the transmission; and a transceiver which, in operation, transmits the sub-band occupancy indicator and the resource allocation indicator over a physical downlink control channel, PDCCH.

In some embodiments, the sub-band occupancy indicator indicates the sub-bands determined to be available for a transmission according to a result of clear channel assessment.

In some embodiments, the transceiver, in operation, transmits the sub-band occupancy indicator via a group-common PDCCH and the resource allocation indicator via a PDCCH specific to the transceiver device or both the sub-band occupancy indicator and the resource allocation indicator via a PDCCH specific to the transceiver device.

In some embodiments, the resource allocation indicator indicates resource blocks as the resources assigned to the transceiver device based on the available sub-bands indicated by the sub-band occupancy indicator.

In some embodiments, the resource allocation indicator indicates resource blocks assigned to the transceiver device within the available sub-bands excluding guard bands at edges of one or more contiguous available sub-bands.

In some embodiments, the resource allocation indicator indicates the resource blocks assigned to the transceiver device by a bitmap indicating resource block groups, each resource block group including at least one resource block within the available sub-bands excluding the guard bands; and the circuitry, in operation, determines the number of resource blocks within one of the resource block groups according to the total number of resource blocks within the union of the available sub-bands excluding the guard bands.

In some embodiments, the resource allocation indicator indicates the resource blocks assigned to the transceiver device by a bitmap indicating resource block groups, each resource block group including at least one resource block within the available sub-bands excluding the guard bands; and the circuitry, in operation, determines the number of resource blocks within one of the resource block groups as equal to the number of guard band resource blocks within each of the guard bands.

In some embodiments, the resource allocation indicator indicates the resource blocks assigned to the transceiver device by a bitmap indicating resource block groups, each resource block group including at least one resource block within the available sub-bands; and the circuitry, in operation, determines the number of resource blocks within each of the resource block groups according to the total number of resource blocks within the union of available sub-bands.

In some embodiments, the resource allocation indicator indicates the resource blocks assigned to the transceiver device by a bitmap indicating resource block groups within a single available sub-band from the available sub-bands, each resource block group including at least one resource block within said single available sub-band; and the circuitry, in operation, determines the number of resource blocks within one of the resource block groups according to the total number of resource blocks within the single available sub-band.

In some embodiments, the resource allocation indicator indicates the resource blocks assigned to the transceiver device by a resource indication value indicating a starting resource block and a length in terms of continuously assigned resource blocks.

In some embodiments, the resource allocation indicator indicates the resource blocks assigned to the transceiver device by a resource indication value indicating a starting resource block and a length in terms of continuously assigned resource blocks within the available sub-bands with an increment in the length depending on the number of available sub-bands.

In some embodiments, the resource allocation indicator indicates the resource blocks assigned to the transceiver device by a resource indication value indicating a starting resource block and a length in terms of continuously assigned resource blocks within a single available sub-band from among the available sub-bands.

Further provided is a method comprising receiving, over a physical download link control channel, PDCCH, a sub-band occupancy indicator indicating sub-bands determined to be available for a transmission, and a resource allocation indicator indicating resources included in the available sub-bands and assigned to a transceiver device for the transmission, and determining the assigned resources according to the resource allocation indicator and the sub-band occupancy indicator.

In some embodiments, the sub-band occupancy indicator indicates the sub-bands determined to be available for a transmission according to a result of clear channel assessment.

In some embodiments, the sub-band occupancy indicator is received via a group-common PDCCH and the resource allocation indicator via a PDCCH specific to the transceiver device, or both the sub-band occupancy indicator and the resource allocation indicator are received via a PDCCH specific to the transceiver device.

In some embodiments, the resource allocation indicator indicates resource blocks as the resources assigned to the transceiver device based on the available sub-bands indicated by the sub-band occupancy indicator.

For example, the resource allocation indicator indicates resource blocks assigned to the transceiver device within the available sub-bands excluding guard bands at edges of one or more contiguous available sub-bands.

In some embodiments, the method further comprises disregarding a plurality of resource blocks as guard band resource blocks at edges of one or more contiguous available sub-bands even if said guard band resource blocks are assigned to the transceiver device according to the resource allocation indicator.

In some embodiments, the resource allocation indicator indicates the resource blocks assigned to the transceiver device by a bitmap indicating resource block groups, each resource block group including at least one resource block within the available sub-bands excluding the guard bands; and the number of resource blocks within one of the resource block groups is determined according to the total number of resource blocks within the union of the available sub-bands excluding the guard bands.

In some embodiments, the resource allocation indicator indicates the resource blocks assigned to the transceiver device by a bitmap indicating resource block groups, each resource block group including at least one resource block within the available sub-bands excluding the guard bands; and the number of resource blocks within one of the resource block groups is determined as equal to the number of guard band resource blocks within each of the guard bands.

In some embodiments, the resource allocation indicator indicates the resource blocks assigned to the transceiver device by a bitmap indicating resource block groups, each resource block group including at least one resource block within the available sub-bands; and the number of resource blocks within each of the resource block groups is determined according to the total number of resource blocks within the union of available sub-bands.

In some embodiments, the resource allocation indicator indicates the resource blocks assigned to the transceiver device by a bitmap indicating resource block groups within a single available sub-band from the available sub-bands, each resource block group including at least one resource block within said single available sub-band; and the number of resource blocks within one of the resource block groups is determined according to the total number of resource blocks within the single available sub-band, and resource block group assignments of the other available sub-bands is determined as equal to the resource block group assignments of the single available sub-band.

In some embodiments, the resource allocation indicator indicates the resource blocks assigned to the transceiver device by a resource indication value indicating a starting resource block and a length in terms of continuously assigned resource blocks.

In some embodiments, the resource allocation indicator indicates the resource blocks assigned to the transceiver device by a resource indication value indicating a starting resource block and a length in terms of continuously assigned resource blocks within the available sub-bands with an increment in the length depending on the number of available sub-bands.

In some embodiments, the resource allocation indicator indicates the resource blocks assigned to the transceiver device by a resource indication value indicating a starting resource block and a length in terms of continuously assigned resource blocks within a single available sub-band from among the available sub-bands; and resource block assignments of the other available sub-bands are determined as equal to the resource block assignments of the single available sub-band.

Further provided is a method comprising determining a sub-band occupancy indicator indicating sub-bands determined to be available for a transmission, determining a resource allocation indicator indicating resources included in the available sub-bands and assigned to a transceiver device for the transmission, and transmitting the sub-band occupancy indicator and the resource allocation indicator over a physical downlink control channel, PDCCH.

In some embodiments, the sub-band occupancy indicator indicates the sub-bands determined to be available for a transmission according to a result of clear channel assessment.

In some embodiments, the sub-band occupancy indicator is transmitted via a group-common PDCCH and the resource allocation indicator via a PDCCH specific to the transceiver device or both the sub-band occupancy indicator and the resource allocation indicator are transmitted via a PDCCH specific to the transceiver device.

In some embodiments, the resource allocation indicator indicates resource blocks as the resources assigned to the transceiver device based on the available sub-bands indicated by the sub-band occupancy indicator.

In some embodiments, the resource allocation indicator indicates resource blocks assigned to the transceiver device within the available sub-bands excluding guard bands at edges of one or more contiguous available sub-bands.

In some embodiments, the resource allocation indicator indicates the resource blocks assigned to the transceiver device by a bitmap indicating resource block groups, each resource block group including at least one resource block within the available sub-bands excluding the guard bands; and the number of resource blocks within one of the resource block groups is determined according to the total number of resource blocks within the union of the available sub-bands excluding the guard bands.

In some embodiments, the resource allocation indicator indicates the resource blocks assigned to the transceiver device by a bitmap indicating resource block groups, each resource block group including at least one resource block within the available sub-bands excluding the guard bands; and the number of resource blocks within one of the resource block groups is determined as equal to the number of guard band resource blocks within each of the guard bands.

In some embodiments, the resource allocation indicator indicates the resource blocks assigned to the transceiver device by a bitmap indicating resource block groups, each resource block group including at least one resource block within the available sub-bands; and the number of resource blocks within each of the resource block groups is determined according to the total number of resource blocks within the union of available sub-bands.

In some embodiments, the resource allocation indicator indicates the resource blocks assigned to the transceiver device by a bitmap indicating resource block groups within a single available sub-band from the available sub-bands, each resource block group including at least one resource block within said single available sub-band; and the number of resource blocks within one of the resource block groups is determined according to the total number of resource blocks within the single available sub-band.

In some embodiments, the resource allocation indicator indicates the resource blocks assigned to the transceiver device by a resource indication value indicating a starting resource block and a length in terms of continuously assigned resource blocks.

In some embodiments, the resource allocation indicator indicates the resource blocks assigned to the transceiver device by a resource indication value indicating a starting resource block and a length in terms of continuously assigned resource blocks within the available sub-bands with an increment in the length depending on the number of available sub-bands.

In some embodiments, the resource allocation indicator indicates the resource blocks assigned to the transceiver device by a resource indication value indicating a starting resource block and a length in terms of continuously assigned resource blocks within a single available sub-band from among the available sub-bands.

The invention claimed is:
1. A transceiver device, comprising:
a transceiver which, in operation, receives, over a physical downlink control channel (PDCCH),
    a sub-band occupancy indicator indicating sub-bands determined to be available for a transmission; and
    a resource allocation indicator indicating resources included in the available sub-bands and assigned to the transceiver device for the transmission; and
circuitry which, in operation, determines the assigned resources according to the resource allocation indicator and the sub-band occupancy indicator,
wherein,
the resource allocation indicator indicates resource blocks as the resources assigned to the transceiver device based on the available sub-bands indicated by the sub-band occupancy indicator, and
the circuitry, in operation, disregards a resource block assigned to the transceiver device according to the resource allocation indicator if the resource block is one of guard band resource blocks at edges of one or more contiguous available sub-bands.

2. The transceiver device according to claim 1, wherein the transceiver, in operation, receives:
the sub-band occupancy indicator via a group-common PDCCH and the resource allocation indicator via a PDCCH specific to the transceiver device,
or
both the sub-band occupancy indicator and the resource allocation indicator via a PDCCH specific to the transceiver device.

3. The transceiver device according to claim 1, wherein
the resource allocation indicator indicates the resource blocks assigned to the transceiver device by a bitmap indicating resource block groups, each resource block group including at least one resource block within the available sub-bands; and
the circuitry, in operation, determines the number of resource blocks within each of the resource block groups according to the total number of resource blocks within the union of the available sub-bands.

4. The transceiver device according to claim 1, wherein
the resource allocation indicator indicates the resource blocks assigned to the transceiver device by a bitmap indicating resource block groups within a single available sub-band from the available sub-bands, each resource block group including at least one resource block within said single available sub-band;
the circuitry, in operation,
determines the number of resource blocks within one of the resource block groups according to the total number of resource blocks within the single available sub-band; and
determines resource block group assignments of the other available sub-bands as equal to the resource block group assignments of the single available sub-band.

5. The transceiver according to claim 1, wherein the resource allocation indicator indicates the resource blocks assigned to the transceiver device by a resource indication value indicating a starting resource block and a length in terms of continuously assigned resource blocks.

6. The transceiver device according to claim 1, wherein the resource allocation indicator indicates the resource blocks assigned to the transceiver device by a resource indication value indicating a starting resource block and a length in terms of continuously assigned resource blocks within the available sub-bands with an increment in the length depending on the number of available sub-bands.

7. The transceiver device according to claim 1, wherein
the resource allocation indicator indicates the resource blocks assigned to the transceiver device by a resource indication value indicating a starting resource block and a length in terms of continuously assigned resource blocks within a single available sub-band from among the available sub-bands; and
the circuitry, in operation, determines resource block assignments of the other available sub-bands as equal to the resource block assignments of the single available sub-band.

8. A scheduling device, comprising:
circuitry which, in operation, determines
a sub-band occupancy indicator indicating sub-bands determined to be available for a transmission; and
a resource allocation indicator indicating resources included in the available sub-bands and assigned to the transceiver device for the transmission; and
a transceiver which, in operation, transmits the sub-band occupancy indicator and the resource allocation indicator over a physical downlink control channel (PDCCH),
wherein,
the resource allocation indicator indicates resource blocks as the resources assigned to the transceiver device based on the available sub-bands indicated by the sub-band occupancy indicator, and
a resource block assigned to the transceiver device according to the resource allocation indicator is disregarded by the transceiver device if the resource block is one of guard band resource blocks at edges of one or more contiguous available sub-bands.

9. A method, comprising
receiving, over a physical download link control channel (PDCCH),
a sub-band occupancy indicator indicating sub-bands determined to be available for a transmission; and
a resource allocation indicator indicating resources included in the available sub-bands and assigned to a transceiver device for the transmission; and
determining the assigned resources according to the resource allocation indicator and the sub-band occupancy indicator,
wherein,
the resource allocation indicator indicates resource blocks as the resources assigned to the transceiver device based on the available sub-bands indicated by the sub-band occupancy indicator, and
a resource block assigned to the transceiver device according to the resource allocation indicator is disregarded by the transceiver device if the resource block is one of guard band resource blocks at edges of one or more contiguous available sub-bands.

10. A method, comprising
determining a sub-band occupancy indicator indicating sub-bands determined to be available for a transmission;
determining a resource allocation indicator indicating resources included in the available sub-bands and assigned to a transceiver device for the transmission; and
transmitting the sub-band occupancy indicator and the resource allocation indicator over a physical downlink control channel (PDCCH),
wherein,
the resource allocation indicator indicates resource blocks as the resources assigned to the transceiver device based on the available sub-bands indicated by the sub-band occupancy indicator, and
a resource block assigned to the transceiver device according to the resource allocation indicator is disregarded by the transceiver device if the resource block is one of guard band resource blocks at edges of one or more contiguous available sub-bands.

* * * * *